(12) United States Patent
Eisenbacher et al.

(10) Patent No.: US 9,458,964 B2
(45) Date of Patent: Oct. 4, 2016

(54) LUBRICANT DISPENSER

(71) Applicants: Egon Eisenbacher, Karlstadt (DE);
Kuno Buehner, Oberbach (DE);
Manfred Grom, Schlimpfhof (DE)

(72) Inventors: Egon Eisenbacher, Karlstadt (DE);
Kuno Buehner, Oberbach (DE);
Manfred Grom, Schlimpfhof (DE)

(73) Assignee: PERMA-TEC GMBH & CO. KG,
Euerdorf (DE)

( * ) Notice: Subject to any disclaimer, the term of this patent is extended or adjusted under 35 U.S.C. 154(b) by 158 days.

(21) Appl. No.: 14/352,046

(22) PCT Filed: Dec. 12, 2012

(86) PCT No.: PCT/EP2012/075291
§ 371 (c)(1),
(2) Date: Apr. 15, 2014

(87) PCT Pub. No.: WO2013/102538
PCT Pub. Date: Jul. 11, 2013

(65) Prior Publication Data
US 2014/0374449 A1 Dec. 25, 2014

(30) Foreign Application Priority Data
Jan. 3, 2012 (DE) .......................... 10 2012 100 035

(51) Int. Cl.
*F16N 7/14* (2006.01)
*F16N 11/08* (2006.01)

(52) U.S. Cl.
CPC ................. *F16N 7/14* (2013.01); *F16N 11/08* (2013.01)

(58) Field of Classification Search
CPC .................................. F16N 7/14; F16N 11/08
USPC ............................................... 184/7.1
See application file for complete search history.

(56) References Cited

U.S. PATENT DOCUMENTS

| 595,826 | A | * | 12/1897 | Walch | ...................... | F16N 11/08 |
| | | | | | | 184/37 |
| 1,645,898 | A | * | 10/1927 | Davis | ........................ | F16N 3/12 |
| | | | | | | 184/38.1 |
| 5,271,528 | A | * | 12/1993 | Chien | ...................... | F16N 11/08 |
| | | | | | | 184/38.4 |

(Continued)

FOREIGN PATENT DOCUMENTS

WO 2010026559 A 3/2010

*Primary Examiner* — Michael Riegelman
(74) *Attorney, Agent, or Firm* — Andrew Wilford

(57) ABSTRACT

The invention relates to a lubricant dispenser having a lubricant cartridge (1), which has a lubricant storage space (2) having an outlet opening (3) for lubricant (4), a carrier (5) which is connected to the lubricant cartridge (1) in a detachable manner and accommodates a battery-operated motor (6) for driving a spindle (7), and a plunger (8) connected to the spindle (7) for ejecting the lubricant (4), wherein an output shaft (9) of the motor (6) is connected to the spindle (7) by means of an adapter (10) and wherein the adapter (10) is mounted in a rotationally movable manner in an accommodation space (11) of the carrier (5) that is open towards the lubricant cartridge (1). A rolling bearing (12), which is arranged between the carrier (5) and the adapter (10), is provided as the bearing of the adapter (10). The adapter (10) is secured axially against falling out of the accommodation space by means of a retaining means (13) that is fastened to the carrier (5) and preferably designed as a lid.

10 Claims, 3 Drawing Sheets

(56) References Cited

U.S. PATENT DOCUMENTS

| | | | |
|---|---|---|---|
| 5,634,531 A * | 6/1997 | Graf | F16N 11/08 184/38.4 |
| 5,971,229 A * | 10/1999 | May | F16N 11/08 222/327 |
| 6,216,822 B1 * | 4/2001 | May | F16N 11/08 184/105.1 |
| 6,675,992 B2 | 1/2004 | Schumann | |
| 6,802,394 B2 * | 10/2004 | Patterson | F16N 11/04 184/105.1 |
| 8,620,479 B2 | 12/2013 | Botha | |
| 2003/0183648 A1 * | 10/2003 | Schumann | F16N 11/08 222/1 |

* cited by examiner

LUBRICANT DISPENSER

CROSS REFERENCE TO RELATED APPLICATIONS

This application is the US-national stage of PCT application PCT/EP2012/075291 filed 12 Dec. 2012 and claiming the priority of German patent application 102012100035.2 itself filed 3 Jan. 2012.

FIELD OF THE INVENTION

The invention relates to a lubricant dispenser comprising a lubricant cartridge having a lubricant storage space with an outlet port for lubricant, a support detachably connected to the lubricant cartridge and holding a battery-operated motor for driving a spindle, and a piston for ejecting the lubricant connected to the spindle, a drive shaft of the motor being connected to the spindle by an adapter that is rotatable in a seat of the support open toward the lubricant cartridge.

BACKGROUND OF THE INVENTION

Such lubricant dispensers are known from practice and from DE 29 715 808 [U.S. Pat. No. 5,971,229]. They are used, for example, for the precise lubrication of equipment parts such as rolling and sliding bearings, linear guides, chains and the like. The lubricant dispensers are connected, for example, to a lubricating point of a bearing and can deliver lubricants as a function of the running time of a machine or at predetermined time intervals.

WO 2010/026559 discloses a lubricant dispenser for a radio-controlled lubricating system. The basic structure of the lubricant dispenser includes a lubricant cartridge containing lubricant, and a battery-operated dispensing mechanism. The latter comprises a piston for forcing lubricant from the cartridge and an actuator mechanism for moving the piston.

During discharge of lubricant, substantial internal pressure is produced in the lubricant storage space. This internal pressure results in an axial force that is transferred via the spindle to the adapter and must be absorbed by an axial bearing. In the known design, the adapter is supported on a sliding disk. As a result of the rotational movement of the adapter under simultaneous force effect, frictional forces arise between the adapter and the sliding disk. The frictional forces between the adapter and the sliding disk can also be increased by contaminants between the disk and the adapter. The drive motor is heavily loaded, with the forces applied to the bearing of the adapter and the resulting torques making a dominant contribution. As the loading of the motor increases, so does the consumption of energy. Furthermore, it has been observed in practice that the motors used for providing the drive were already worn out after emptying only a few cartridges.

OBJECT OF THE INVENTION

It is the object of the invention to reduce the forces and torques acting on the motor of the spindle drive in a lubricant dispenser with the features described above to increase the service life of the motor and reduce energy consumption.

The object is achieved by a lubricant dispenser in which a roller bearing is provided as a support for the adapter and lies between the support and the adapter, and the adapter is secured axially against falling out of the seat by a retaining element attached to the support. The retaining element only acts on the adapter as long as no pressure builds up on the interior of the lubricant cartridge. As soon as the lubricant dispenser is put in operation and backpressure occurs as a result of an ejecting movement of the piston against the piston surface, the adapter is released by the retaining element and a gap forms between the retaining element and the adapter, thus ensuring contact-free, friction-free and wear-free rotation of the adapter on the retaining element.

As a result of the adapter bearing according to the invention, the source of friction described above is nearly eliminated. A slight torque is now necessary in order to overcome the sum of the frictional forces. The motor used, which is preferably an electric geared motor, bears less of a load as a result, thus reducing motor damage and increasing the reliability of the lubricant dispenser overall. Moreover, it is possible to use lower-performance motors in the lubricant dispenser that are not only less expensive but also require less current and less installation space. By virtue of the design according to the invention, power consumption can be reduced. Overall, the energy efficiency is increased as a result of the reduction of mechanical losses. One effect of the teaching according to the invention is that less battery capacity is required to empty the lubricant cartridge. This results in decreased environmental impact. A smaller battery can be used to operate the lubricant dispenser compared to the prior art. Furthermore, the teaching according to the invention can be used to deliver a larger quantity of lubricant while using a given conventional battery, or to ensure the secure delivery of lubricant at lower operating temperatures. This improves the possible applications of the lubricant dispenser in the open at low temperatures.

Preferably, the retaining element consists of a cap that is attached to the support and has a hole through which the spindle extends, the edge of the hole projecting over the outer edge of the adapter provided in the seat, thus securing it axially. This is of particular importance when changing the lubricant cartridge in order to fill it with new lubricant or for any maintenance work, since the adapter must be prevented from falling off during disassembly of the lubricant dispenser.

The retaining element of cup shape has two functions. For one, it has the described retaining function for the adapter and, for another, it has the function of protecting the roller bearing. If the lubricant dispenser is idle, the adapter lies against the edge of the hole of the cap. As a result, sliding-off of the adapter in the direction of the lubricant cartridge is ruled out. What is more, no contaminants can penetrate the space between the adapter and the edge, so the seat and particularly the roller bearing are protected from contamination. As described at the outset, the adapter is moved minimally axially during delivery, so there is no contact between the adapter and the cap under the load of the lubricant dispenser. This ensures frictionless rotation of the adapter during operation of the lubricant dispenser.

Preferably, the cap is cup-shaped and is detachably connected to the support by a snap-on connection or a screw connection. The detachable connection is selected here such that a sliding-off of the adapter is not possible, even when considering the weight of the coupled spindle, the piston and the roller bearing. The cap lies against a front face of the support turned toward the lubricant cartridge and is thus integrated into the lubricant dispenser in a space-saving manner.

Different bearings can be used as roller bearings. Preferably, an axial grooved ball bearing or an axial roller bearing is provided. The roller bearing advantageously has a race ring and two bearing disks equipped with rolling elements, with tracks for the rolling elements formed in the bearing disks. One bearing disk is supported on the support and another on the adapter, the bearing disk supported on the support being stationary during delivery of the lubricant and the bearing disk supported on the adapter being fixed to and rotational with the adapter. The roller bearings are characterized by very low wear and a long service life and can absorb great axial forces.

The support has a front face turned toward the lubricant cartridge and a rear end facing away from the lubricant cartridge. An attachment with control electronics is provided on the rear end of the support. The retaining element provided on the front face of the support, the support and the attachment are preferably connected to a drive module by screws that extend through holes of the support. Advantageously, the lubricant dispenser can be opened, for example in order to refill the lubricant cartridge with lubricant, without the possibility of the objects integrated in the module falling off. Loss and damage are therefore ruled out.

The attachment is firmly provided in a housing cover that is detachably connected to the lubricant cartridge.

In addition, a battery compartment is provided in the support for accommodating at least one battery for supplying power to the control electronics and motor. The power source used in the battery compartment is advantageously fixed by a detent.

The housing cover lies against an edge of the lubricant cartridge and can preferably be braced against the lubricant cartridge by a retaining ring provided on the housing cover. For this purpose, the lubricant cartridge has an external thread and the retaining ring has an internal thread that are screwed together. The housing cover can have stops between which the retaining ring can be moved axially. Loss of the ring is then ruled out. The mounting of the housing cover on the lubricant cartridge is simpler than in the lubricant dispensers known in practice, in which an internal thread is provided on the housing cover. In the lubricant dispenser according to the invention, the housing cover can be mounted in an accurately fitting manner on the lubricant cartridge and be fixed by screwing the ring with the lubricant cartridge. The danger of threads of the lubricant cartridge and of the retaining ring stripping during assembly is low if the internal thread is formed on a dimensionally stable and relatively narrow ring and not on the side of the housing cover, which, for cost-related reasons, is generally thin-walled and made of plastic having moderate dimensional stability.

The piston has a cylindrical collar that, before startup of the lubricant dispenser, engages in an annular space between the support and an inner surface of the lubricant cartridge. The collar and the support are if complementary cross-sectional shape such that they can be pushed over each other in a precisely fitting manner. One advantage resulting from this is that the rear of the spindle is forcibly centered in the adapter. Preferably, the connecting end of the spindle has a polygonal shape.

BRIEF DESCRIPTION OF THE DRAWING

The invention is explained in further detail below with reference to the schematic drawing, which shows only one embodiment. Therein.

SPECIFIC DESCRIPTION OF THE INVENTION

Figure 1:
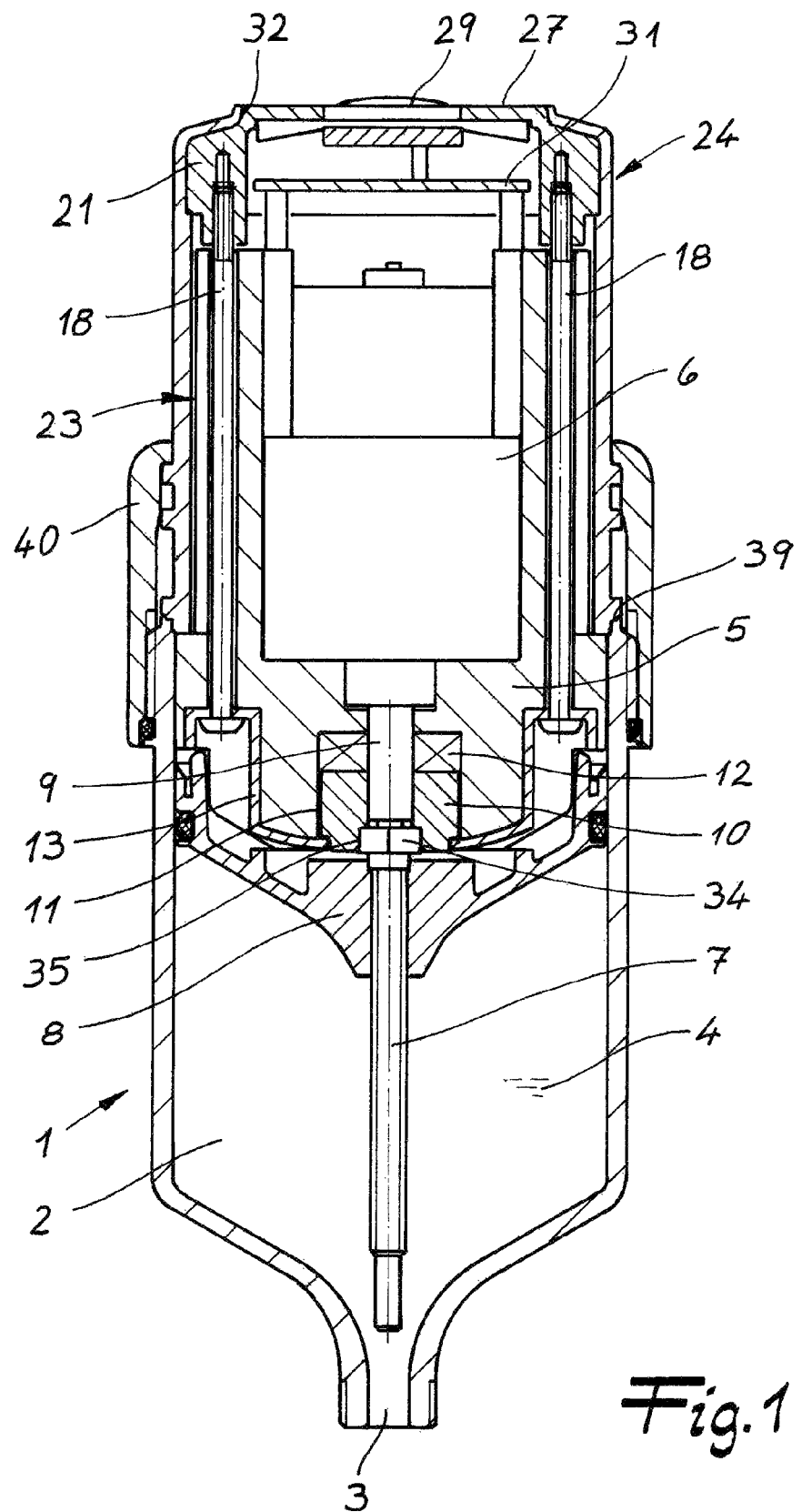
FIG. 1 is a longitudinal section through the lubricant dispenser.

The basic construction of the lubricant dispenser shown in the figures comprises: a lubricant cartridge 1 having a lubricant storage space 2 with an outlet port 3 for a lubricant 4; a support 5 detachably connected to the lubricant cartridge 1 and housing a battery-driven motor 6 for driving a threaded spindle 7; and a piston 8 connected to the spindle 7 for ejecting the lubricant. The motor 6, which is an electric geared motor in the lubricant dispenser shown, has a drive shaft 9 that is connected to the spindle 7 by an adapter 10. The adapter 10 rotates in a seat 11 formed in the support 5 and open toward the lubricant cartridge 1. A roller bearing 12 rotationally supports the adapter 10 and is provided between the support 5 and the adapter 10. The adapter 10 is secured axially against falling out of the seat 11 by a retaining element 13 attached to the support 5.

According to FIG. 1, the retaining element 13 consists of a cap attached to the support 5. The element 13 fits complementarily over a front face of the support 5 directed toward the lubricant cartridge 1. The element 13 has a hole 15 through which the spindle 7 and a tapered end piece of the adapter 10 extend (see FIG. 3), with the inner edge 16 of the hole 15 projecting inward past the outer edge 17 of the adapter 10 in the seat 11, thus axially securing the adapter 10. In an unloaded state of the lubricant dispenser, as shown here, a joint surface of the adapter 10 lies against the edge 16 of the hole 15. This is advantageous, particularly when changing the lubricant cartridge, because the adapter 10 then cannot fall out of the seat 11 when the lubricant dispenser is disassembled.

As can be seen in FIG. 1, the cap forming the retaining element 13 is cup-shaped and detachably connected to the support 5 by a screws 18. As shown, the screws 18 fit through holes extending through the support 5 and are screwed into an attachment 21 on the rear end of the support 5. The cap-shaped retaining element 13, the support 5 and the attachment 21 are thus connected to a drive module 23 by the screws 18.

The attachment 21 is solidly seated in a housing cover 24 that is detachably connected to the lubricant cartridge 1. The attachment 21 has a control panel 27 for setting up the lubricant dispenser and is equipped with a printed circuit board 31 for the control electronics. Moreover, a display 29 is provided. The control panel 27 extends through an opening 32 on the end of the housing cover 24 and can therefore be viewed and operated from outside the lubricant dispenser.

It can be seen in FIG. 1 that the spindle 7 is of polygonal section at its rear end 34 inserted into a complementary seat 35 of the adapter 10.

Figure 2:
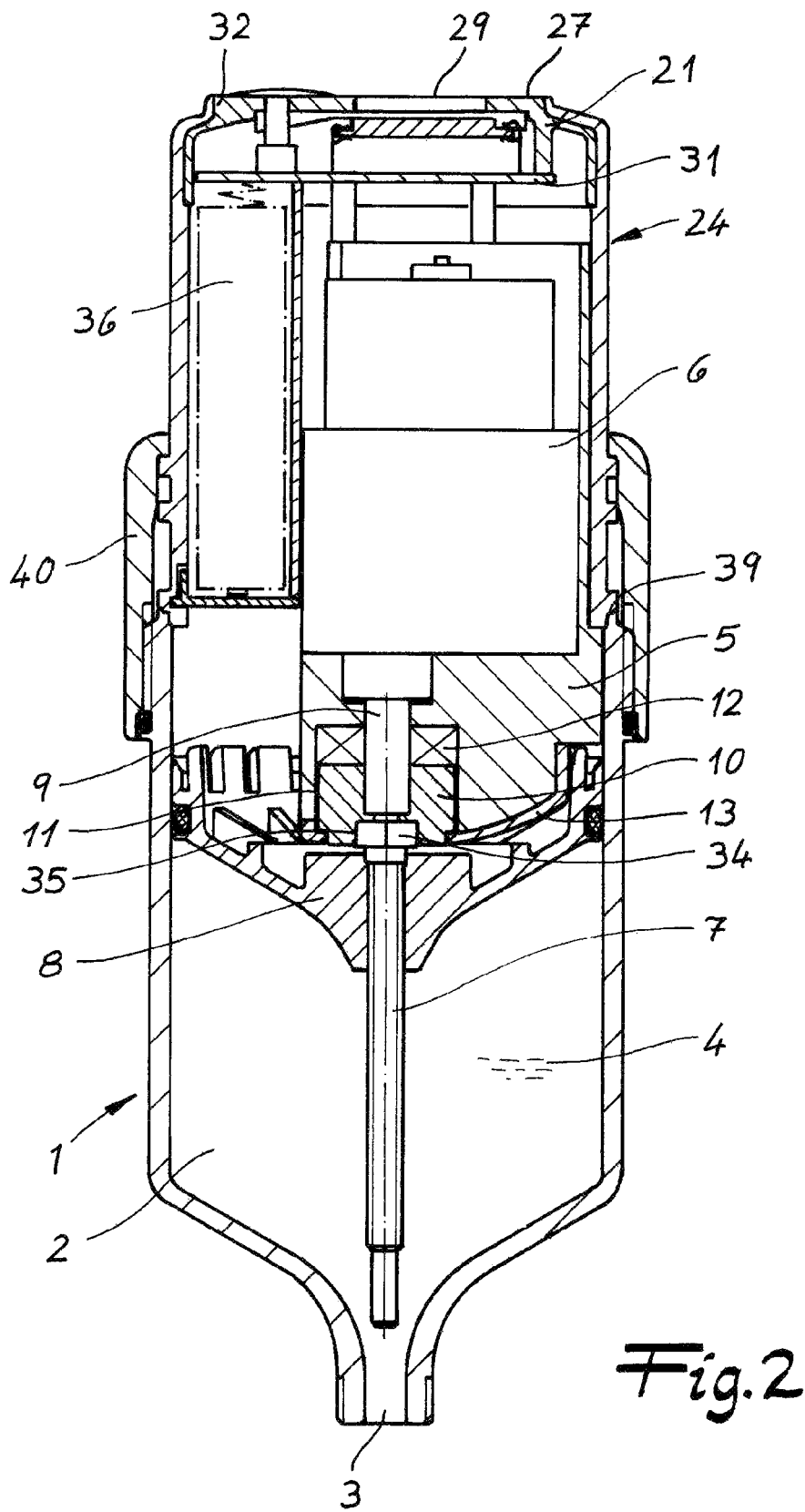
FIG. 2 is another section through the lubricant dispenser on a plane perpendicular to that of FIG. 1.

According to FIG. 2, a battery compartment 36 is provided in the support 5 to hold at least one battery to supply power to the control electronics and the motor 6. Furthermore, FIG. 2 shows that the housing cover 24 lies against an end face 39 of the lubricant cartridge 1 and is detachably braced against the lubricant cartridge 1 by a retaining ring 40 provided on the housing cover 24. To this end, the lubricant cartridge 1 has an external thread and the retaining ring 40 has an internal thread that can be screwed together. The retaining ring 40 is advantageously a dimensionally stable ring and can have a profile on its outer side for improving grip and/or connecting surfaces for a rotary tool.

Figure 3:
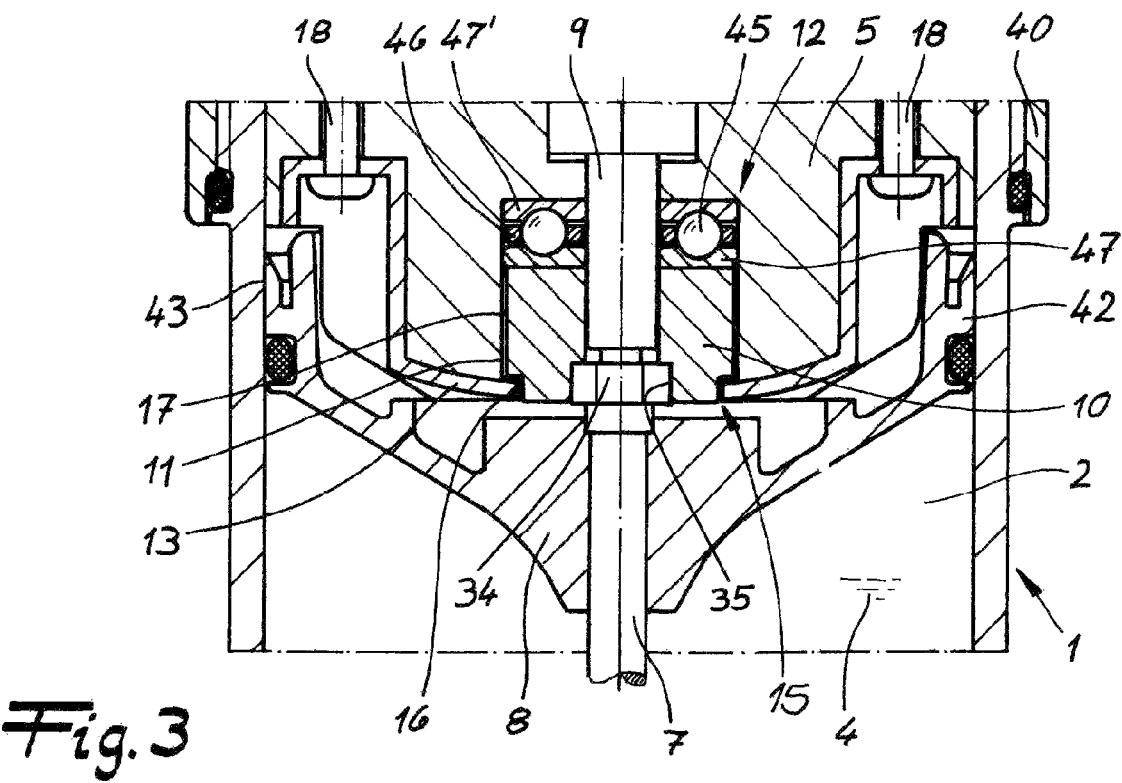
FIG. 3 is a large-scale view of a detail from FIG. 1.

As can be seen in the FIG. 3, the piston 8 has a cylindrical collar 42 that, before startup of the lubricant dispenser, engages in an annular space 43 between the support 5 and the inner surface of the lubricant cartridge 1. The collar 42 and the support 5 are formed such that they are complementary so they can be pushed onto each other and interfit.

Figure 4:
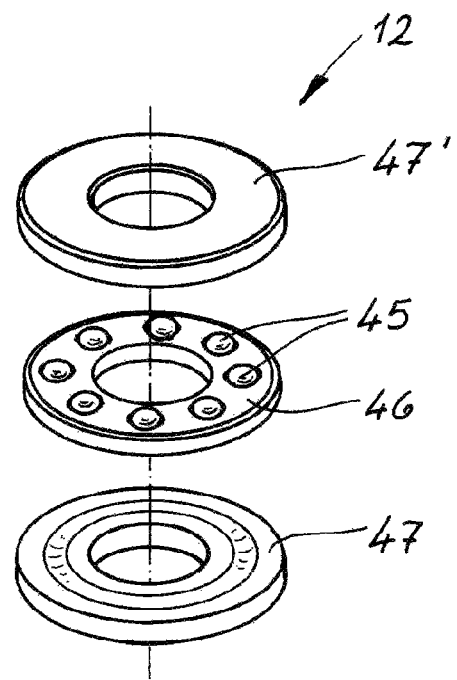
FIG. 4 shows a roller bearing for use in the lubricant dispenser shown in FIGS. 1 to 3.

The roller bearing 12 of the lubricant dispenser shown in FIG. 4 is an axial grooved ball bearing and has a race ring 46 equipped with rolling elements 45 and two end disks 47 and 47' formed with seats for the rolling elements 45. The roller bearing 12 has a central hole through which the drive shaft 9 of the motor 6 passes, with the drive shaft 9 ending in the adapter 10 and rotationally fixed therein. The disks 47 and 47' are supported on the support 5 and on the adapter 10, respectively, the bearing disk 47' being supported fixedly on the support 5 during delivery of the lubricant 4, and the disk 47 on the adapter 10 being fixed on and rotating with the adapter 10 with the rolling elements 45 being set into motion as a result. If the lubricant dispenser is under a load, which is to say if lubricant 4 is being pumped from it, the spindle 7 is driven, as a result of which the piston 8 moves forward toward the outlet port 3. The internal pressure thus produced in the lubricant dispenser results in an axial force that is transferred rearward via the spindle 7 to the adapter 10. As a result of this force, the adapter 10 moves minimally axially and is pressed with force against the roller bearing 12.

The invention claimed is:

1. A lubricant dispenser comprising:
   a lubricant cartridge having a storage space for lubricant with a front outlet port for the lubricant;
   a spindle in the cartridge and defining an axis;
   a support detachably connected to the lubricant cartridge and having a seat open axially forward toward the space;
   a battery-operated motor carried on the support and having a drive shaft extending axially forward into the seat for driving the spindle;
   an axially displaceable piston for ejecting the lubricant and connected to the spindle such that rotation of the spindle axially forwardly advances the piston, pressurizes the lubricant in the space, and presses lubricant in the space forward out of the port;
   an adapter rotatable in the seat of the support
   a roller bearing in the seat axially between the support and the adapter; and
   a retaining cap attached to the support having a hole through which the spindle extends, and formed with an inner edge projecting over an outer edge of the adapter in the seat, the inner edge bearing axially rearward on the adapter and retaining the adapter and the roller bearing in the seat only when the lubricant in the space is not pressurized, and spaced axially forward from the adapter and out of contact with the adapter when the lubricant is pressurized.

2. The lubricant dispenser defined in claim 1, wherein the cap is cup-shaped and is detachably connected to the support by a snap-on or a screw connection.

3. The lubricant dispenser defined claim 1, wherein the roller bearing is an axial grooved ball bearing or an axial roller bearing.

4. The lubricant dispenser defined in claim 3, wherein the roller bearing has a race ring equipped with rolling elements and two bearing disks formed with tracks for the rolling elements.

5. The lubricant dispenser defined claim 1, wherein the support has a front face turned toward the lubricant cartridge and a rear end facing away from the lubricant cartridge, the dispenser further comprising:
   an attachment with control electronics on the rear end of the support, the retaining element, and
   screws extending through the support from the retaining element to the attachment.

6. The lubricant dispenser defined in claim 5, wherein the support has a battery compartment for at least one battery.

7. The lubricant dispenser defined in claim 5, further comprising:
   a housing cover solidly connected to the attachment and detachably connected to the lubricant cartridge.

8. The lubricant dispenser defined in claim 7, wherein the housing cover lies against an end edge of the lubricant cartridge, the dispenser further comprising:
   a retaining ring on the housing cover and bracing the housing cover against the lubricant cartridge.

9. The lubricant dispenser defined claim 1, wherein the piston has a cylindrical collar that engages in an annular space between the support and an inner surface of the lubricant cartridge.

10. A lubricant dispenser comprising:
    a lubricant cartridge extending along an axis forming a storage space for a lubricant and having an axial front end formed with an outlet port for the lubricant;
    a support detachably connected to an axial rear end of the lubricant cartridge and formed centered on the axis with an axially forwardly open seat;
    a threaded spindle extending along the axis in the storage space and having a noncylindrical rear end juxtaposed with the support at the seat and a front end juxtaposed with the outlet port;
    a piston threaded on the spindle and movable axially forward on rotation of the spindle so as to pressurize the lubricant in the space and expel the lubricant from the port;
    a battery-operated motor carried on the support and having a drive shaft extending along the axis into the seat;
    an adaptor rotatable in the seat by the shaft about the axis and fitted with the rear end of the spindle such that rotation of the shaft is transmitted through the adapter to the spindle;
    a roller bearing in the seat and braced axially rearward on the support and axially forward on the adapter; and
    a retaining cap attached to the support having a hole through which the spindle extends, and formed with an inner edge projecting over an outer edge of the adapter in the seat, the inner edge bearing axially rearward on the adapter and retaining the adapter and the roller bearing in the seat only when the lubricant in the space is not pressurized, and spaced axially forward from the adapter and out of contact with the adapter when the lubricant is pressurized.

* * * * *